US008845783B2

United States Patent
Takaoka et al.

(10) Patent No.: US 8,845,783 B2
(45) Date of Patent: Sep. 30, 2014

(54) FAILURE DETECTION APPARATUS AND FAILURE DETECTION METHOD FOR A PARTICULATE FILTER

(75) Inventors: Kazuya Takaoka, Susono (JP); Daisuke Shibata, Numazu (JP); Hiroshi Sawada, Gotenba (JP); Toru Kidokoro, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/637,586

(22) PCT Filed: Mar. 26, 2010

(86) PCT No.: PCT/JP2010/055436
§ 371 (c)(1),
(2), (4) Date: Sep. 26, 2012

(87) PCT Pub. No.: WO2011/118035
PCT Pub. Date: Sep. 29, 2011

(65) Prior Publication Data
US 2013/0014641 A1 Jan. 17, 2013

(51) Int. Cl.
*B01D 46/30* (2006.01)
*B01D 50/00* (2006.01)
(Continued)

(52) U.S. Cl.
CPC ........... *F01N 11/002* (2013.01); *F01N 2550/04* (2013.01); *F01N 3/0253* (2013.01); *F01N 3/035* (2013.01); *F02D 41/1467* (2013.01); *F01N 2900/0408* (2013.01); *F01N 2560/05* (2013.01); *Y02T 10/47* (2013.01); *F02D 2200/0812* (2013.01); *F01N 9/002* (2013.01);
(Continued)

(58) Field of Classification Search
USPC ............ 55/522–524; 422/169–172, 177–182; 95/26
See application file for complete search history.

(56) References Cited

U.S. PATENT DOCUMENTS

2006/0254265 A1* 11/2006 Odajima et al. ................ 60/297
2007/0089399 A1 4/2007 Rhodes et al.
(Continued)

FOREIGN PATENT DOCUMENTS

JP 2005-325812 A 11/2005
JP 2006-316647 A 11/2006
(Continued)

OTHER PUBLICATIONS

International Search Report for PCT/JP2010/055436 dated Jun. 22, 2010, English Translation.

*Primary Examiner* — Amber Orlando
(74) *Attorney, Agent, or Firm* — Sughrue Mion, PLLC (57) ABSTRACT

The present invention is intended to detect a failure of a PM filter with a higher degree of accuracy. The present invention is provided with: a PM trapping efficiency calculation part to calculate a PM trapping efficiency (which is a proportion of an amount of particulate matter trapped with respect to an amount of inflow particulate matter) based on an amount of inflow particulate matter obtained by an inflow particulate matter obtaining part, and an amount of outflow particulate matter detected by a PM sensor; and a failure detection part to make a determination that a failure has occurred in the PM filter, in cases where there has appeared a tendency for the PM trapping efficiency to decrease during a period of time until the execution of the following filter regeneration processing is started after the completion of execution of the filter regeneration processing.

5 Claims, 4 Drawing Sheets (51) Int. Cl.
  B01D 39/14 (2006.01)
  B01D 39/20 (2006.01)
  B01D 39/06 (2006.01)
  B01D 24/00 (2006.01)
  F01N 3/025 (2006.01)
  F01N 9/00 (2006.01)
  F01N 11/00 (2006.01)
  F01N 3/035 (2006.01)
  F02D 41/14 (2006.01)

(52) U.S. Cl.
  CPC . *F01N 2900/0412* (2013.01); *F01N 2900/0601* (2013.01); F02D 41/1466 (2013.01); *F01N 2900/1606* (2013.01)
  USPC ...... 95/26; 55/522; 55/523; 55/524; 422/169; 422/170; 422/171; 422/172; 422/177; 422/178; 422/179; 422/180; 422/181; 422/182

(56) References Cited

U.S. PATENT DOCUMENTS

| | | |
|---|---|---|
| 2009/0094963 A1 | 4/2009 | Mizoguchi et al. |
| 2009/0301062 A1 | 12/2009 | Sumida et al. |
| 2011/0010071 A1 | 1/2011 | Rhodes et al. |

FOREIGN PATENT DOCUMENTS

| | | |
|---|---|---|
| JP | 2007-132290 A | 5/2007 |
| JP | 2007-304068 A | 11/2007 |
| JP | 2007-315275 A | 12/2007 |
| JP | 2008-190502 A | 8/2008 |
| JP | 2009-512814 A | 3/2009 |
| JP | 2009-191694 A | 8/2009 |
| JP | 2009-293518 A | 12/2009 |

* cited by examiner

Fig. 4

FAILURE DETECTION APPARATUS AND FAILURE DETECTION METHOD FOR A PARTICULATE FILTER

CROSS REFERENCE TO RELATED APPLICATIONS

This application is a National Stage of International Application No. PCT/JP2010/055436 filed Mar. 26, 2010, the contents of which are incorporated herein by reference in their entirety.

TECHNICAL FIELD

The present invention relates to a failure detection apparatus and a failure detection method for a particulate filter (hereinafter referred to as a PM filter) which is arranged in an exhaust passage of an internal combustion engine, and which traps particulate matter (Particulate Matter: hereinafter referred to as PM) in an exhaust gas.

BACKGROUND ART

In a PM filter arranged in an exhaust passage of an internal combustion engine, failure such as breakage, erosion or the like may occur due to heat deterioration and time degradation. As a technique of detecting a failure of such a PM filter, there has been known one in which a failure is detected based on a difference in the exhaust gas pressure between the upstream side and the downstream side of the PM filter. If the PM filter is in failure, the flow rate of an exhaust gas passing through the PM filter will increase, so that the difference in the exhaust gas pressure between the upstream side and the downstream side of the PM filter will become smaller in comparison with the case where the PM filer is normal. Accordingly, the failure of the PM filter can be detected based on the pressure difference.

However, if the extent of the failure of the PM filter is not relatively so large, there will not be a clear difference in value of such a pressure difference in comparison with the case where the PM filter is normal. Thus, in recent years, there has been made a proposal that, in order to detect the failure of a PM filter, a PM sensor is used which serves to detect an amount of particulate matter in an exhaust gas for the failure detection.

For example, in Patent Document 1, there is disclosed a technique in which the failure of a PM filter is determined based on the amount of particulate matter detected by a PM sensor which is arranged at the downstream side of the PM filter. In addition, in this Patent Document, there is described that the failure determination of the PM filter is prohibited when the amount of accumulation or deposition of particulate matter in the PM filter is equal to or less than a reference amount of deposition.

In addition, in Patent Document 2, there is disclosed a technique in which the failure of a PM trapper is determined based on a ratio between a detected value of an input PM sensor arranged at the upstream side of the PM trapper, and a detected value of an output PM sensor arranged at the downstream side of the PM trapper.

PRIOR ART REFERENCES

Patent Documents

Patent Document 1: Japanese patent application laid-open No. 2007-315275

Patent Document 2: Japanese patent application laid-open No. 2007-132290

Patent Document 3: Japanese patent application laid-open No. 2009-512814

Patent Document 4: Japanese patent application laid-open No. 2008-190502

Patent Document 5: Japanese patent application laid-open No. 2007-304068

Patent Document 6: Japanese patent application laid-open No. 2009-191694

SUMMARY OF THE INVENTION

Problems to be Solved by the Invention

When a failure occurs in a PM filter, the amount of particulate matter flowing out of the PM filter will increase. For that reason, in cases where a PM sensor is arranged at the downstream side of the PM filter in an exhaust passage of an internal combustion engine, the failure of the PM filter can be detected based on a detected value of the PM sensor.

However, the detected value of the PM sensor may show variation for each product. In other words, even if the actual amount of particulate matter in the exhaust gas is the same, the detected value of each PM sensor may vary to a more or less extent. When such variation occurs, it becomes difficult to detect the failure of the PM filter with a higher degree of accuracy based on the detected value of the PM sensor.

The present invention has been made in view of the above-mentioned problems, and has for its object to provide a technique which it is capable of detecting a failure of a PM filter with a higher degree of accuracy.

Means for Solving the Problems

In the present invention, a PM trapping efficiency, which is a proportion of an amount of particulate matter trapped by a PM filter with respect to an amount of particulate matter flowing into the PM filter, is calculated, and a failure of the PM filter is detected based on the tendency of change of this PM trapping efficiency.

More specifically, a failure detection apparatus for a particulate filter according to the present invention, in which a failure of the particulate filter arranged in an exhaust passage of an internal combustion engine is detected, comprises:

a filter regeneration processing execution part that executes filter regeneration processing to remove particulate matter deposited on said particulate filter;

an inflow PM amount obtaining part that obtains an amount of inflow particulate matter which is an amount of the particulate matter flowing into said particulate filter;

a PM sensor that detects an amount of outflow particulate matter which is an amount of the particulate matter flowing out from said particulate filter;

a PM trapping efficiency calculation part that calculates a PM trapping efficiency, which is a proportion of an amount of particulate matter trapped by said particulate filter with respect to the amount of inflow particulate matter, based on the amount of inflow particulate matter obtained by said inflow particulate matter obtaining part, and the amount of outflow particulate matter detected by said PM sensor; and a failure detection part that makes a determination that a failure has occurred in said particulate filter, in cases where there has appeared a tendency for the PM trapping efficiency calculated by said PM trapping efficiency calculation part to decrease during a period of time until the execution of the following filter regeneration processing is started after the execution of the filter regeneration processing by said filter regeneration processing execution part is completed.

In cases where the particulate filter (hereinafter also referred to as the PM filter) is normal, the PM trapping efficiency tends to increase during the period of time until the execution of the following filter regeneration processing is started after the completion of execution of the filter regeneration processing. On the other hand, in cases where a failure has occurred in the PM filter, when an amount of deposition of the particulate matter becomes equal to or more than a certain amount after the completion of execution of the filter regeneration processing, the amount of outflow particulate matter increases in accordance with the increasing flow rate of the exhaust gas which passes through a failed portion of the PM filter. As a result, the PM trapping efficiency decreases. Accordingly, in cases where the tendency for the PM trapping efficiency to decrease has appeared, a determination can be made that a failure has occurred in the PM filter.

In addition, even if the output value of the PM sensor with respect to an actual amount of outflow particulate matter has variation for each product, an amount of change in the output value of the PM sensor with respect to an amount of change in the actual amount of outflow particulate matter becomes constant. For that reason, an amount of decrease of the PM trapping efficiency with respect to an amount of increase of outflow particulate matter at the time when the amount of outflow particulate matter has increased also becomes constant. Accordingly, by determining a failure of the PM filter based on the tendency of the change of the PM trapping efficiency, it is possible to detect the failure of the PM filter with a higher degree of accuracy.

Here, even if a failure has occurred in the PM filter, the PM trapping efficiency tends to rise, until the amount of deposition of the particulate matter in the PM filter reaches a certain amount after the completion of execution of the filter regeneration processing, similarly to the case where the PM filter is normal. Accordingly, in the present invention, the failure detection part may make a determination that a failure has occurred in the PM filter, in cases where the PM trapping efficiency tends to decrease at the time when an integrated value of the amount of inflow particulate matter after the completion of execution of the filter regeneration processing by the filter regeneration processing execution part becomes equal to or larger than a threshold value for the execution of failure determination.

Here, the threshold value for the execution of failure determination is a value with which a decision can be made that if a failure has occurred in the PM filter, the amount of deposition of the particle matter in the PM filter has increased to an amount in which there appears a tendency for the PM trapping efficiency to decrease. Such a threshold value can be beforehand obtained based on experiments, etc.

In the present invention, the failure detection part may make a determination that a failure has occurred in the PM filter, when an amount of decrease of the PM trapping efficiency calculated by the PM trapping efficiency calculation part during a fixed period of time is equal to or more than a predetermined reference amount. In addition, the failure detection part may make a determination that a failure has occurred in the PM filter, when a rate of decrease of the PM trapping efficiency, which is a value obtained by dividing an amount of decrease of the PM trapping efficiency calculated by the PM trapping efficiency calculation part during a fixed period of time by an integrated value of an amount of inflow particulate matter during said fixed period of time, is equal to or more than a predetermined reference value. In these cases, the predetermined reference amount or the predetermined reference value is a threshold value with which it can be decided that a failure has occurred in the PM filter. Such a threshold value can be beforehand obtained based on experiments, etc.

The present invention can also be grasped as a failure detection method for a particulate filter. For example, a failure detection method for a particulate filter, as one form of the present invention, in which a failure of the particulate filter arranged in an exhaust passage of an internal combustion engine is detected, comprises:

a filter regeneration processing execution step to execute filter regeneration processing to remove particulate matter deposited on said particulate filter;

a PM trapping efficiency calculation step to calculate a PM trapping efficiency, which is a proportion of an amount of particulate matter trapped by said particulate filter with respect to an amount of inflow particulate matter, based on the amount of inflow particulate matter obtained by an inflow PM amount obtaining part that obtains the amount of inflow particulate matter which is an amount of the particulate matter flowing into said particulate filter, and an amount of outflow particulate matter detected by a PM sensor that detects the amount of outflow particulate matter which is an amount of the particulate matter flowing out from said particulate filter; and a failure detection step to make a determination that a failure has occurred in said particulate filter, in cases where there has appeared a tendency for the PM trapping efficiency calculated in said PM trapping efficiency calculation step to decrease during a period of time until the execution of the following filter regeneration processing is started after the execution of the filter regeneration processing in said filter regeneration processing execution step is completed.

Advantageous Effect of the Invention

According to the present invention, it is possible to detect a failure of a PM filter with a higher degree of accuracy.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

Embodiment

Here, description will be made by taking, as an example, a case in which the present invention is applied to the detection of a failure of a PM filter which is arranged in an exhaust passage of a diesel engine for driving a vehicle. It is to be noted that the internal combustion engine related to the present invention is not limited to a diesel engine, but may be a gasoline engine.

(Schematic Construction of Intake and Exhaust Systems of the Internal Combustion Engine)

Figure 1:
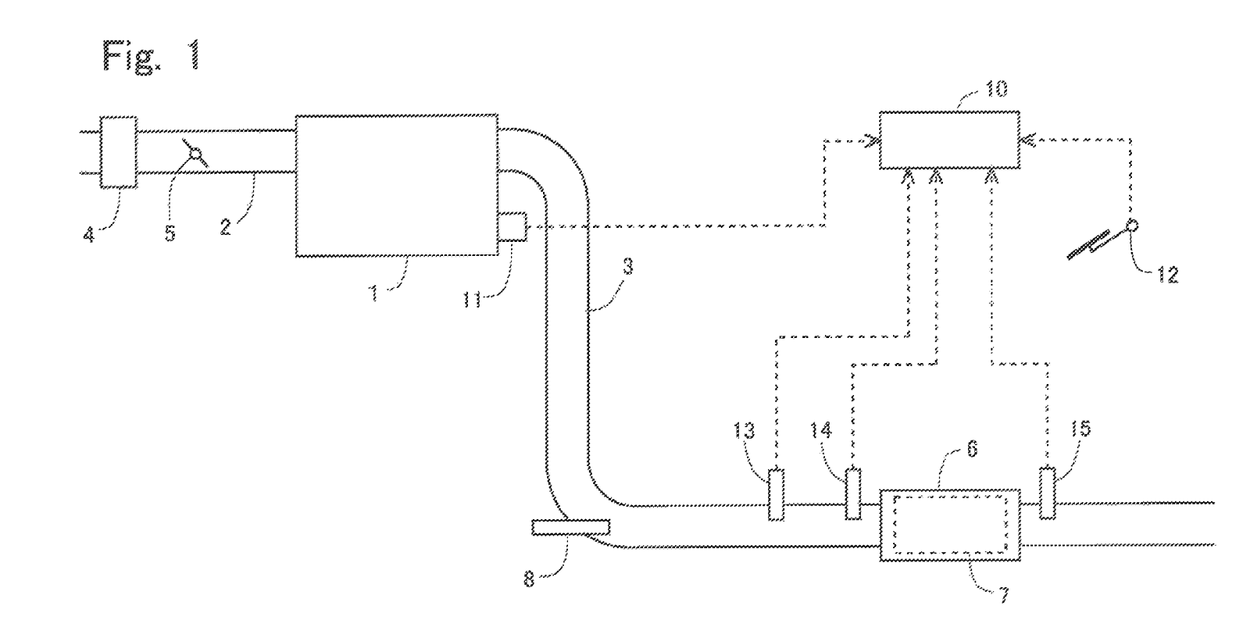
FIG. 1 This is a view showing the schematic construction of intake and exhaust systems of an internal combustion engine according to an embodiment of the present invention.

FIG. 1 is a view showing the schematic construction of intake and exhaust systems of an internal combustion engine according to this embodiment. The internal combustion engine 1 is a diesel engine for driving a vehicle. An intake passage 2 and an exhaust passage 3 are connected to this internal combustion engine 1.

In the intake passage 2, there are arranged an air flow meter 4 and a throttle valve 5. The air flow meter 4 serves to detect an amount of intake air sucked into the internal combustion engine 1. The throttle valve 5 serves to adjust the flow rate of intake air flowing through the intake passage 2 by changing the channel cross section of the intake passage 2.

A PM filter 6 for trapping particulate matter (PM) in an exhaust gas is arranged in the exhaust passage 3. An oxidation catalyst 7 is supported on the PM filter 6. Here, note that the catalyst supported on the PM filter 6 may be a catalyst having an oxidation function (e.g., NOx storage reduction catalyst), other than the oxidation catalyst. In addition, the catalyst having an oxidation function may be arranged in the exhaust passage 3 at the upstream side of the PM filter 6.

A fuel addition valve 8, which serves to add or inject fuel into the exhaust gas, is arranged in the exhaust passage 3 at the upstream side of the PM filter 6. A temperature sensor 13 and an upstream side PM sensor 14 are arranged in the exhaust passage 3 at locations between the fuel addition valve 8 and the PM filter 6. In addition, a downstream side PM sensor 15 is arranged in the exhaust passage 3 at the downstream side of the filter 6.

The temperature sensor 13 serves to detect the temperature of the exhaust gas flowing into the PM filter 6. The upstream side PM sensor 14 detects an amount of particulate matter contained in the exhaust gas flowing into the PM filter (i.e., an amount of inflow particulate matter). The downstream side PM sensor 15 detects an amount of particulate matter contained in the exhaust gas flowing out from the PM filter 6 (i.e., an amount of outflow particulate matter).

As the PM sensors 14, 15, there can be used any of well-known PM sensors such as those which are disclosed in Japanese patent application laid-open No. 2008-190502, Japanese patent application laid-open No. 2007-304068, and Japanese patent application laid-open No. 2009-191694. A PM sensor (soot sensor) disclosed in Japanese patent application laid-open No. 2008-190502 has an insulation structure in which electrodes are arranged in an alternate manner, and detects the amount of particulate matter by making use of a characteristic in which the electrodes become conductive to make a resistance value therebetween small when particulate matter adheres to and accumulates or deposits on the electrodes. A PM sensor disclosed in Japanese patent application laid-open No. 2007-304068 has an oxidation catalyst, and detects the amount of particulate matter based on an amount of temperature rise at the time when particulate matter deposited on the oxidation catalyst is caused to combust or burn. A PM sensor disclosed in Japanese patent application laid-open No. 2009-191694 detects the concentration of particulate matter in the exhaust gas by means of an optical technique.

In addition, in the internal combustion engine 1, there is arranged in combination therewith an electronic control unit (ECU) 10 for controlling the internal combustion engine 1. The air flow meter 4, the temperature sensor 13, the upstream side PM sensor 14, and the downstream side PM sensor 15 are electrically connected to the ECU 10. Moreover, a crank position sensor 11 of the internal combustion engine 1, and an accelerator opening sensor 12 of the vehicle on which the internal combustion engine 1 is mounted are electrically connected to the ECU 10. And, the output signals of these sensors are inputted to the ECU 10. The ECU 10 can derive an engine rotational speed of the internal combustion engine 1 based on the output signal of the crank position sensor 11. In addition, the ECU 10 can derive an engine load of the internal combustion engine 1 based on the output signal of the accelerator opening sensor 12.

The throttle valve 5 and the fuel addition valve 8 are electrically connected to the ECU 10. Thus, these valves are controlled by means of the ECU 10.

Here, note that in this embodiment, the upstream side PM sensor 14 corresponds to an inflow PM amount obtaining part according to the present invention. The amount of inflow particulate matter may be estimated based on the engine load, engine rotational speed, etc., of the internal combustion engine 1 by means of the ECU 10 without using the PM sensor. Also, in this embodiment, the downstream side PM sensor 15 corresponds to a PM sensor according to the present invention.

(Filter Regeneration Processing)

The particulate matter in the exhaust gas trapped by the PM filter 6 accumulates or deposits on the PM filter 6 in a gradual manner. In this embodiment, filter regeneration processing is carried out in order to remove the particulate matter deposited on the PM filter 6. The filter regeneration processing according to this embodiment is achieved by adding fuel into the exhaust gas from the fuel addition valve 8 thereby to supply the fuel to the oxidation catalyst 7. Heat of oxidation is generated by the oxidation of the fuel supplied to the oxidation catalyst 7. The temperature of the oxidation catalyst 7 and the temperature of the PM filter 6 are caused to go up due to this heat of oxidation. As a result, the particulate matter deposited on the PM filter 6 is oxidized and removed.

In the filter regeneration processing according to this embodiment, the amount of fuel added from the fuel addition valve 8 is regulated based on the temperature of the exhaust gas detected by the temperature sensor 13. By regulating the amount of fuel addition, the temperature of the oxidation catalyst 7 and the temperature of the PM filter 6 are caused to go up to a temperature at which the particulate matter can be oxidized. Here, note that in this embodiment, the ECU 10, which carries out the filter regeneration processing by controlling the fuel addition valve 8, corresponds to a filter regeneration processing execution part according to the present invention.

The filter regeneration processing can be achieved by other techniques. For example, fuel may be supplied to the oxidation catalyst 7 by carrying out an auxiliary fuel injection at timing after a main fuel injection in the internal combustion engine 1, instead of performing the addition of fuel by the fuel addition valve 8. In addition, the particulate matter may be oxidized by causing the temperature of the PM filter 6 to rise by means of an electric heater.

In this embodiment, the execution of the above-mentioned filter regeneration processing may be started at the time when the integrated value of the amount of inflow particulate matter after the execution of the last filter regeneration processing has been completed reaches a predetermined threshold value for the start of execution of the regeneration processing. In addition, after the start of execution of the filter regeneration processing, the execution thereof is stopped at the time when a period of time has elapsed which is a predetermined threshold value for the stop of execution of the regeneration processing. Here, note that the method of determining the timings of the start and stop of execution of the filter regeneration processing is not limited to these.

(PM Trapping Efficiency)

Figure 2:
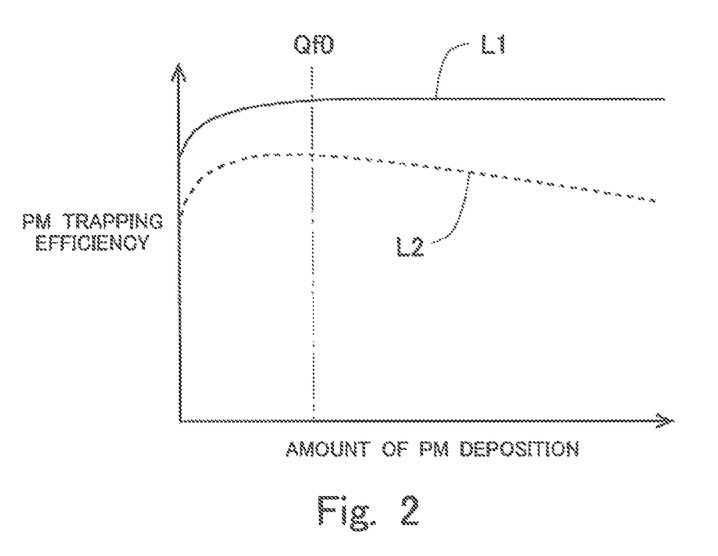
FIG. 2 This is a view showing the change of a PM trapping efficiency with respect to an amount of PM deposition after the completion of filter regeneration processing.

Here, reference will be made to the relation between the amount of PM deposition in the PM filter 6, and the PM trapping efficiency of the PM filter 6 (the ratio of the amount of particulate matter trapped by the PM filter 6 to the amount of inflow particulate matter) based on FIG. 2. FIG. 2 is a view showing the change of the PM trapping efficiency with respect to the amount of PM deposition after the completion of the filter regeneration processing. In FIG. 2, the axis of abscissa represents the amount of PM deposition in the PM filter 6, and the axis of ordinate represents the PM trapping efficiency in the PM filter 6. Also, in FIG. 2, a solid line L1 indicates the change of the PM trapping efficiency in the case where the PM filter 6 is normal, and a broken line L2 indicates the change of the PM trapping efficiency in the case where a failure has occurred in the PM filter 6.

The amount of PM deposition in the PM filter 6 increases again in a gradual manner after the completion of execution of the filter regeneration processing. At this time, in cases where the PM filter 6 is normal, the PM trapping efficiency increases gradually in accordance with the increasing amount of PM deposition until the amount of PM deposition increases to a certain amount, as shown by the solid line L1 in FIG. 2. Then, when the amount of PM deposition becomes equal to or more than the certain amount, the PM trapping efficiency will become substantially constant.

On the other hand, as shown by the broken line L2 in FIG. 2, in cases where a failure has occurred in the PM filter 6, too, the PM trapping efficiency increases to some extent in accordance with the increasing amount of PM deposition after the completion of execution of the filter regeneration processing. However, when the amount of PM deposition reaches a certain extent of amount, the flow rate of the exhaust gas passing through a failed portion of the PM filter 6 will increase in accordance with the increasing pressure inside the PM filter 6. For that reason, the amount of particulate matter flowing out from the PM filter 6 by way of the failed portion thereof also increases. As a result, even if the amount of PM deposition increases, the PM trapping efficiency will decrease.

(Failure Detection of the PM Filter)

Accordingly, in this embodiment, the PM trapping efficiency is calculated, and the failure of the PM filter 6 is detected based on a change in this PM trapping efficiency. In other words, if the PM trapping efficiency tends to decrease at the time when the integrated value of the amount of inflow particulate matter after the completion of execution of the filter regeneration processing becomes equal to or larger than a threshold value for the execution of failure determination, it is determined that a failure has occurred in the PM filter 6. Here, the threshold value for the execution of failure determination is a value with which a decision can be made that if a failure has occurred in the PM filter 6, the amount of PM deposition in the PM filter 6 has increased to an amount (e.g., an amount indicated by Qf0 in FIG. 2) in which there appears a tendency for the PM trapping efficiency to decrease. The threshold value has been set in advance based on experiments, etc., and stored in the ECU 10.

Figure 3:
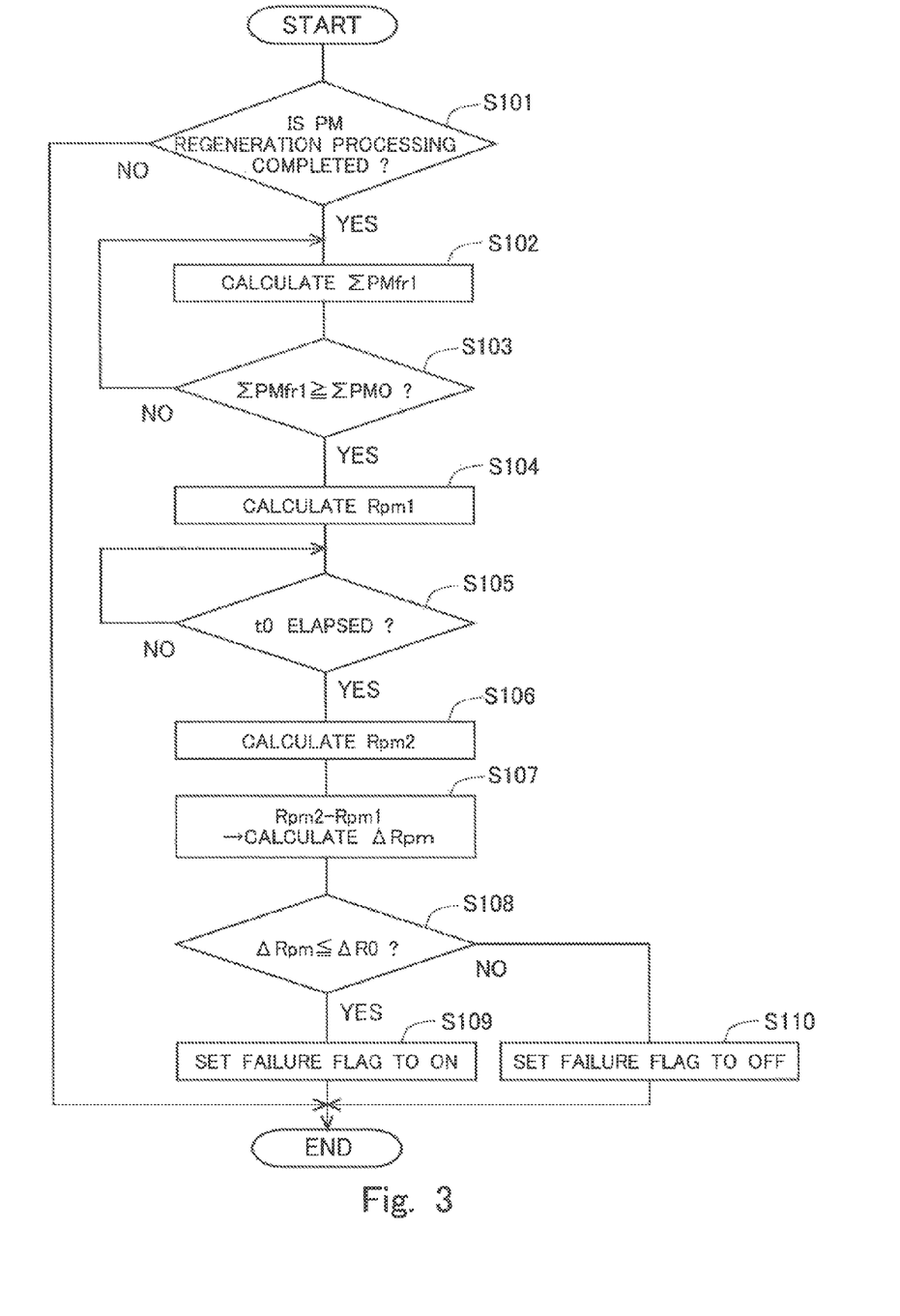
FIG. 3 This is a flow chart showing a flow for detecting a failure of a PM filter according to the embodiment.

Hereinafter, reference will be made to a flow of the failure detection for the PM filter according to this embodiment based on a flow chart shown in FIG. 3. This flow has been beforehand stored in the ECU 10, and is repeatedly carried out by the ECU 10 at a predetermined interval.

In this flow, first in step S101, it is determined whether the execution of the filter regeneration processing has been completed. In cases where it is determined that the execution of the filter regeneration processing has been completed, in step S102, an integrated value $\Sigma PMfr1$ of the amount of inflow particulate matter from the point in time at which the execution of the filter regeneration processing has been completed is calculated.

Then, in step S103, it is determined whether the integrated value $\rho PMfr1$ of the amount of inflow particulate matter calculated in step S102 has become equal to or more than a threshold value $\Sigma PM0$ for the execution of failure determination. In cases where it is determined that the integrated value $\Sigma PMfr1$ has not reached the threshold value $\Sigma PM0$, the calculation of the integrated value $\Sigma PMfr1$ of the amount of inflow particulate matter in step S102 is repeated. On the other hand, in cases where it is determined that the integrated value $\Sigma PMfr1$ has become equal to or more than the threshold value $\Sigma PM0$, the processing in step S104 is then carried out.

In step S104, a PM trapping efficiency Rpm1 at the present point in time in the PM filter 6 is calculated. Here, note that in this embodiment, a PM trapping efficiency Rpm is calculated based on the following equation (1).

$$Rpm = 1 - (PMrr/PMfr) \qquad \text{Equation (1)}$$

In equation (1) above, PMfr is the amount of inflow particulate matter, and PMrr is the amount of outflow particulate matter.

Subsequently, in step S105, it is determined whether a predetermined time t0 has elapsed after the PM trapping efficiency Rpm1 is calculated. The predetermined period of time t0 is a fixed period of time which has been set in advance as a period of time in which it is possible to determine the tendency of the change of the PM trapping efficiency in the PM filter 6. In cases where it is determined that the predetermined period of time t0 has elapsed, then in step S106, a PM trapping efficiency Rpm2 at the present point in time in the PM filter 6 is calculated based on the above-mentioned equation (1), as in the case of the PM trapping efficiency Rpm1.

Then, in step S107, an amount of change $\Delta Rpm$ of the PM trapping efficiency is calculated by subtracting the PM trapping efficiency Rpm1 calculated in step 104 from the PM trapping efficiency Rpm2 calculated in step 106. If the PM trapping efficiency Rpm has decreased, the amount of change $\Delta Rpm$ of the PM trapping efficiency will be a negative value.

Thereafter, in step S108, it is determined whether the amount of change $\Delta Rpm$ of the PM trapping efficiency calculated in step S107 is equal to or less than a predetermined reference value $\Delta R0$. Here, the predetermined reference value $\Delta R0$ is a threshold value which is a negative value, and with which it can be decided that a failure has occurred in the PM filter 6.

In step S108, in cases where it is determined that the amount of change $\Delta Rpm$ of the PM trapping efficiency is equal to or less than the predetermined reference value $\Delta R0$, a determination is made that a failure has occurred in the PM filter 6. In this case, then in step S109, a failure flag for the PM filter 6 is set to on. On the other hand, in step S108, in cases where it is determined that the amount of change $\Delta Rpm$ of the PM trapping efficiency is not equal to and less than the predetermined reference value $\Delta R0$, a determination is made that the PM filter 6 is normal. In this case, then in step S110, the failure flag for the PM filter 6 is set to off.

Here, note that in this embodiment, the ECU 10, which carries out the steps S104 and S106 in the above-mentioned flow, corresponds to a PM trapping efficiency calculation part according to the present invention. In addition, the steps S104 and S106 in the above-mentioned flow correspond to a PM trapping efficiency calculation process or step according to the present invention. Moreover, the ECU 10, which carries out the steps S108 and S109 in the above-mentioned flow, corresponds to a failure detection part according to the present invention. The steps S108 and S109 in the above-mentioned flow correspond to a failure detection process or step according to the present invention.

Here, when a failure occurs in the PM filter 6, the value of the PM trapping efficiency itself may become smaller in comparison with the case where the PM filter 6 is normal, as shown in FIG. 2. However, when variation for each product exists in the output values of the PM sensors 14, 15, the value of the PM trapping efficiency calculated based on the output values of the PM sensors 14, 15 will also show variation. In this case, it becomes difficult to detect the failure of the PM filter 6 with a high degree of accuracy based on the value of the PM trapping efficiency itself.

On the other hand, as mentioned above, in this embodiment, a parameter for the failure determination of the PM filter 6 is the amount of change (i.e., the amount of decrease) of the PM trapping efficiency. The amount of change (the amount of decrease) of the PM trapping efficiency is not a value which changes resulting from the variation for each product of the output values of the PM sensors 14, 15. As a result, according to a failure detection method for a PM filter according to this embodiment, it is possible to detect the failure of the PM filter 6 with a higher degree of accuracy.

(Modification)

In this embodiment, a rate of change of the PM trapping efficiency may be calculated by dividing the amount of change of the PM trapping efficiency by an integrated value of the amount of inflow particulate matter during a period of time in which the amount of change has occurred, and the failure determination of the PM filter 6 may be carried out by using the rate of change of the PM trapping efficiency as a parameter.

Figure 4:
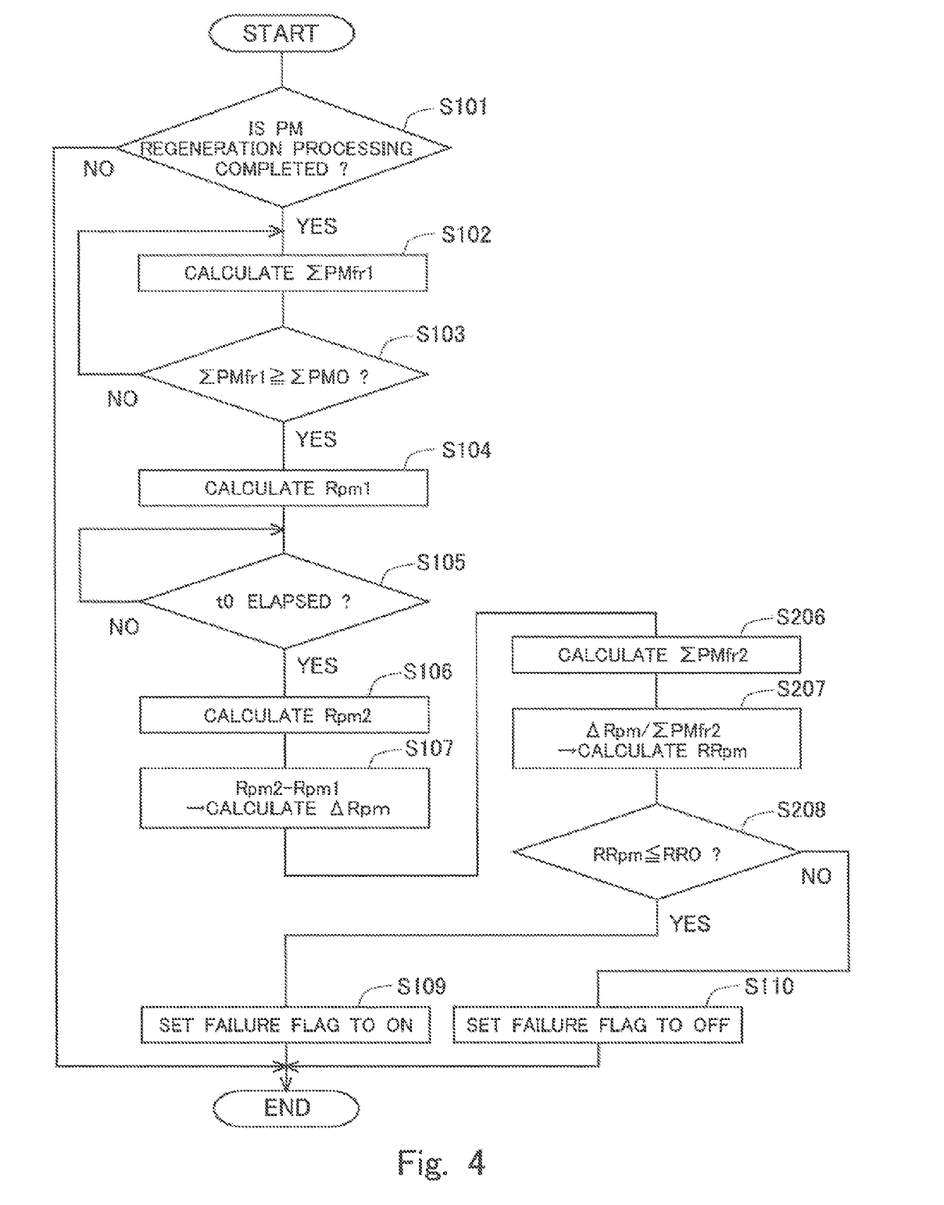
FIG. 4 This is a flow chart showing a flow for detecting a failure of a PM filter according to a modified form of the embodiment.

Hereinafter, reference will be made to a flow of the failure detection for a PM filter according to a modified form of this embodiment based on a flow chart shown in FIG. 4. This flow has been beforehand stored in the ECU 10, and is repeatedly carried out by the ECU 10 at a predetermined interval. It is to be noted that in the flow chart shown in FIG. 4, the same reference numbers are attached to those steps in which the same processings as those shown in the flow chart shown in FIG. 3 are carried out. Here, only differences from the above-mentioned flow shown in FIG. 3 will be explained.

In this flow, in step S206, an integrated value ΣPMfr2 of the amount of inflow particulate matter in the predetermined period of time t0 after the PM trapping efficiency Rpm1 is calculated in step S104 until the PM trapping efficiency Rpm2 is calculated in step S106 is calculated. Then, in step S207, a rate of change RRpm of the PM trapping efficiency is calculated by dividing the amount of change ΔRpm of the PM trapping efficiency calculated in step 107 by the integrated value ΣPMfr2 of the amount of inflow particulate matter calculated in step 206.

Thereafter, in step S208, it is determined whether the rate of change RRpm of the PM trapping efficiency calculated in step S207 is equal to or less than a predetermined reference value RR0. Here, the predetermined reference value RR0 is a threshold value which is a negative value, and with which it can be decided that a failure has occurred in the PM filter 6.

In step S208, in cases where it is determined that the rate of change RRpm of the PM trapping efficiency is equal to or less than the predetermined reference value RR0, a determination is made that a failure has occurred in the PM filter 6. On the other hand, in step S208, in cases where it is determined that the rate of change RRpm of the PM trapping efficiency is not equal to and less than the predetermined reference value RR0, a determination is made that the PM filter 6 is normal.

Here, note that in this modified form, the ECU 10, which carries out the steps S208 and S109 in the above-mentioned flow, corresponds to a failure detection part according to the present invention. In addition, the steps S208 and S109 in the above-mentioned flow correspond to a failure detection process or step according to the present invention.

In this modified form, the rate of change (the rate of decrease) of the PM trapping efficiency, which becomes a parameter for the failure determination of the PM filter 6, is also not a value which changes resulting from the variation for each product of the output values of the PM sensors 14, 15. As a result, according to the failure detection method for a PM filter according to this modified form, too, it is possible to detect the failure of the PM filter 6 with a higher degree of accuracy.

In addition, in this embodiment, after the completion of execution of the filter regeneration processing, during a period of time from a point in time at which the integrated value ΣPMfr1 of the amount of inflow particulate matter becomes equal to or more than the threshold value ΣPM0 for the execution of failure determination until the execution of the following filter regeneration processing is started, the amount of change ΔRpm or the rate of change RRpm of the PM trapping efficiency may be calculated in a plurality of times. Then, based on the values of the amount of change ΔRpm or the rate of change RRpm of the PM trapping efficiency thus calculated in the plurality of times, it may be determined whether the PM trapping efficiency is in a decreasing tendency. According to this, it is possible to further enhance the accuracy in detecting the failure of the PM filter 6.

Moreover, in this embodiment, the amount of change or the rate of change of the PM trapping efficiency may also be calculated in a continuous manner after the completion of execution of the filter regeneration processing. Then, when any of these values becomes a negative value, during a period of time until the execution of the following filter regeneration processing is started, a determination may be made that a failure has occurred in the PM filter 6.

EXPLANATION OF REFERENCE NUMERALS AND CHARACTERS

1 . . . internal combustion engine
3 . . . exhaust passage
6 . . . particulate filter (PM filter)
7 . . . oxidation catalyst
8 . . . fuel addition valve
10 . . . ECU
11 . . . crank position sensor
12 . . . accelerator opening sensor
14 . . . upstream side PM sensor
15 . . . downstream side PM sensor

The invention claimed is:
1. A failure detection apparatus for a particulate filter in which a failure of the particulate filter arranged in an exhaust passage of an internal combustion engine is detected, said failure detection apparatus for a particulate filter comprising:
a filter regeneration processing execution part that executes filter regeneration processing to remove particulate matter deposited on said particulate filter;

an inflow PM amount obtaining part that obtains an amount of inflow particulate matter which is an amount of the particulate matter flowing into said particulate filter;

a PM sensor that detects an amount of outflow particulate matter which is an amount of the particulate matter flowing out from said particulate filter;

an electronic control unit (ECU) including program logic configured to calculate a PM trapping efficiency, which is a proportion of an amount of particulate matter trapped by said particulate filter with respect to the amount of inflow particulate matter, based on the amount of inflow particulate matter obtained by said inflow particulate matter obtaining part, and the amount of outflow particulate matter detected by said PM sensor, and to determine that a failure has occurred in said particulate filter, in cases where there has appeared a tendency for the PM trapping efficiency calculated by said ECU to decrease during a period of time beginning after the execution of the filter regeneration processing by said filter regeneration processing execution part is completed and ending when the execution of the following filter regeneration processing is started, and the decrease level of the PM trapping efficiency during a fixed period of time is equal to or more than a predetermined reference level.

2. The failure detection apparatus for a particulate filter as set forth in claim 1, wherein said ECU is configured to determine that a failure has occurred in said particulate filter, when an amount of decrease of the PM trapping efficiency calculated by said ECU during a fixed period of time is equal to or more than a predetermined reference amount.

3. The failure detection apparatus for a particulate filter as set forth in claim 1, wherein said ECU is configured to determine that a failure has occurred in said particulate filter, when a rate of decrease of the PM trapping efficiency, which is a value obtained by dividing an amount of decrease of the PM trapping efficiency calculated by said ECU during a fixed period of time by an integrated value of an amount of inflow particulate matter during said fixed period of time, is equal to or more than a predetermined reference value.

4. A failure detection method for a particulate filter in which a failure of the particulate filter arranged in an exhaust passage of an internal combustion engine is detected, said failure detection method for a particulate filter comprising:

a filter regeneration processing execution step to execute filter regeneration processing to remove particulate matter deposited on said particulate filter;

a PM trapping efficiency calculation step to calculate a PM trapping efficiency, which is a proportion of an amount of particulate matter trapped by said particulate filter with respect to an amount of inflow particulate matter, based on the amount of inflow particulate matter obtained by an inflow PM amount obtaining part that obtains the amount of inflow particulate matter which is an amount of the particulate matter flowing into said particulate filter, and an amount of outflow particulate matter detected by a PM sensor that detects the amount of outflow particulate matter which is an amount of the particulate matter flowing out from said particulate filter; and a failure detection step to make a determination that a failure has occurred in said particulate filter, in cases where there has appeared a tendency for the PM trapping efficiency calculated in said PM trapping efficiency calculation step to decrease during a period of time beginning after the execution of the filter regeneration processing in said filter regeneration processing execution step is completed and ending when the execution of the following filter regeneration processing is started, and the decrease level of the PM trapping efficiency during a fixed period of time is equal to or more than a predetermined reference level.

5. The failure detection apparatus for a particulate filter as set forth in claim 1, wherein said fixed period is a period which starts on or after the time when an integrated value of the amount of inflow particulate matter after the completion of execution of the filter regeneration processing by said filter regeneration processing execution part becomes equal to or more than a threshold value for the execution of failure determination.

* * * * *